United States Patent [19]

Park

[11] 4,347,329
[45] Aug. 31, 1982

[54] EXPANDABLE POLYOLEFIN COMPOSITIONS AND POLYOLEFIN FOAM PREPARATION PROCESS

[75] Inventor: Chung P. Park, Pickerington, Ohio

[73] Assignee: The Dow Chemical Company, Midland, Mich.

[21] Appl. No.: 154,332

[22] Filed: May 29, 1980

[51] Int. Cl.$^3$ .............................................. C08J 9/14
[52] U.S. Cl. ...................................... 521/79; 521/94; 521/95; 521/97; 521/98; 521/134; 521/910; 264/DIG. 5
[58] Field of Search .................. 521/98, 79, 134, 910; 264/DIG. 5

[56] References Cited

U.S. PATENT DOCUMENTS 3,644,230 2/1972 Cronin .................................. 521/97
3,657,165 4/1972 Kawai et al. ........................ 521/910
3,766,099 10/1973 Kawai et al. ........................... 521/98
4,102,829 7/1978 Watanabe et al. ................... 521/98
4,110,269 8/1978 Ehrenfreund .......................... 521/98
4,129,530 12/1978 Park et al. .............................. 521/79
4,214,054 7/1980 Watanabe et al. ................. 521/143
4,229,396 10/1980 Suh ....................................... 521/98

Primary Examiner—Morton Foelak
Attorney, Agent, or Firm—James B. Guffey

[57] ABSTRACT

The use, in an otherwise conventional polyolefin extrusion foaming process, of a stability control agent (e.g., stearamide, EAA copolymer, etc.) in conjunction with certain mixed blowing agent systems (e.g., 5–50 weight percent trichloromonofluoromethane and 50–95 weight percent dichlorodifluoromethane) provides closed-cell olefin polymer foam articles having increased maximum achievable cross-sections and good dimensional stability.

20 Claims, No Drawings

EXPANDABLE POLYOLEFIN COMPOSITIONS AND POLYOLEFIN FOAM PREPARATION PROCESS

BACKGROUND OF THE INVENTION

The present invention relates to a process for the preparation of olefin polymer foams and, in particular, to an extrusion foaming process for olefin polymers using a stability control additive in conjunction with a blowing agent mixture consisting essentially of dichlorodifluoromethane and at least one aliphatic hydrocarbon, or halogenated hydrocarbon, compound having an atmospheric pressure boiling point of from about 0° C. to about 50° C.

In addition, the present invention also relates to an expandable olefin polymer composition containing the indicated stability control additive and mixed blowing agent system admixed therein and to polyolefin foams prepared therefrom.

It is well known to prepare olefin polymer foams by heat plastifying a normally solid olefin polymer resin, admixing such heat plastified resin with a volatile blowing agent under heat and pressure to form a flowable gel and thereafter extruding the gel into a zone of lower pressure and temperature to expand and cool the gel to form the desired solid olefin foam product.

A problem frequently encountered is that of preventing an unacceptable degree of shrinkage of partially cured foam during the aging or curing period following manufacture. During the "aging" or "curing" period the blowing agent employed is gradually diffusing out of the cells in the foam product and air is gradually diffusing into the cells in place thereof. For example, until very recently only one blowing agent (i.e., 1,2-dichlorotetrafluoroethane) was known or thought to be capable of providing sufficient dimensional stability during the curing period to permit the commercially viable manufacture of low density (e.g., 1-6 pounds per cubic foot) foams of ethylenic polymer resins.

More recently, certain technology has been developed in the area of stability control agents in an attempt to permit the obtention of commercially acceptable dimensional stability with a wider range of volatile halogenated hydrocarbon blowing agents. (See, for example, U.S. Pat. No. 3,644,230 and Watanabe et al. U.S. application Ser. No. 952,865 filed Oct. 19, 1978, now U.S. Pat. No. 4,214,054, issued July 22, 1980). Unfortunately, these techniques, while generally providing low density ethylenic polymer foams having improved dimensional stability, are somewhat limited in terms of the maximum cross-section of the foam articles that can be obtained therewith from a given type of extrusion apparatus. Accordingly, it would be highly desirable to provide an improved extrusion foaming process capable of producing low density olefin polymer foam articles having both relatively large cross-sectional areas (e.g., providing an increase in the maximum achievable foam cross-sectional area which can be obtained with a given extrusion apparatus) and good dimensional stability as well as other desirable foam properties such as closed cells of small cell size and the like.

SUMMARY OF THE INVENTION

In accordance with the present invention such a process for preparing closed-cell olefin polymer foam articles having increased maximum achievable cross-sectional areas on a given type or size of extrusion apparatus and having good dimensional stability is provided along with an expandable olefin polymer composition suitable for use therein. In such process, (A) a normally solid olefin polymer resin is heat plastified and intimately admixed, under elevated temperature and pressure,
  (1) with a stability control agent and
  (2) with a mixed blowing agent
    (a) which comprises from about 50 to about 95 weight percent of dichlorodifluoromethane and from about 5 to about 50 weight percent of an aliphatic hydrocarbon compound, or a halogenated hydrocarbon compound, having an atmospheric pressure boiling point of from about 0° C. to about 50° C., and
    (b) which has a saturated vapor pressure of less than about 32 kg/cm$^2$ but greater than about 22 kg/cm$^2$ at 100° C.; and
(B) the resultant mixture is then extruded into a zone of lower pressure and cooled to thereby form an olefin polymer foam.

The aforementioned process is particularly well suited for the preparation of closed-cell olefin polymer foamed articles of relatively low density, e.g., from about 1 to about 6 (especially from about 1 to about 3) pounds per cubic foot (pcf) having relatively small or fine cell size and having relatively large cross-sectional areas (e.g., cross-sectional areas in excess of 50 or 60 square inches taken in a plane perpendicular to the direction of extrusion of the foamed article involved). In addition, such process is especially advantageous in that it permits the preparation of such articles without excessive shrinkage during the manufacture thereof and/or during the storage thereof in fresh foam (i.e., partially cured) form. That is, the resulting foamed articles have—in fresh foam form—relatively good ambient temperature (e.g., 70° F.) dimensional stability; typically shrinking to no less than about 85 (preferably no less than about 90 and most preferably no less than about 95) percent of their initial foamed volume under such manufacturing and/or storage (e.g., aging or curing) conditions. In addition, such foamed articles also have, in fresh foam form, relatively good elevated temperature stability; typically shrinking to no less than about 80 (preferably to no less than about 85) percent of their original volume during prolonged exposure at 150° F.

DETAILED DESCRIPTION OF THE INVENTION

Olefin polymer resins suitably used in the practice of the present invention include ethylene homopolymers such as low, medium or high density polyethylene, and ethylene copolymers such as ethylene-vinyl acetate copolymers, ethylene-propylene copolymers, ethylene-1-butene copolymers, ethylene-butadiene copolymers, ethylene-vinyl chloride copolymers, ethylene-methyl methacrylate copolymers, ethylene-acrylonitrile copolymers, substantially non-neutralized ethylene-acrylic acid copolymers and the like. As the olefin polymer resin, it is preferable to use an ethylene homopolymer or a copolymer having an ethylene content above 50 percent by weight, preferably above 75 percent by weight. Naturally, blends of two or more of such olefin polymer resins can also be suitably employed in the practice of the present invention.

Stability control agents suitable for use herein include the long-chain fatty acid/polyol partial esters described in U.S. Pat. No. 3,644,230 as well as higher alkyl amines, fatty acid amides and complete esters of higher fatty acids such as those described in Watanabe et al. U.S. application Ser. No. 952,865, filed Oct. 19, 1978 (now U.S. Pat. No. 4,214,054; issued July 22, 1980) and the pertinent teachings of such patents are hereby incorporated by reference thereto. Typically such stability control additives are employed in an amount ranging from 0.1 to about 10 weight percent based upon the weight of the olefin polymer employed and preferably they are employed at a level of from about 0.5 to about 5 weight percent of such olefin polymer resin. In addition to (or in place of) the foregoing stability control additives, there may also be employed for such purpose substantially non-neutralized copolymers of α-olefins with various monoethylenically unsaturated carboxylic acids such as, for example, copolymers of a major portion of ethylene containing copolymerized therewith a minor proportion of a monoethylenically unsaturated carboxylic acid such as acrylic acid, methacrylic acid and the like. (Preferred carboxyl-bearing copolymers for such permeability modification include ethylene-acrylic acid copolymers having from about 3 to about 45, preferably from about 15 to about 45, weight percent of acrylic acid copolymerized therein.) When such carboxyl-containing copolymers are so used, the amount of their usage is not particularly critical so long as a sufficient amount is employed to impart the desired dimensional stability to the resulting olefin polymer foam product. However, as a general rule (a) when the carboxyl-containing polymer contains relatively lower proportions of acid monomer (e.g., from 3 to about 15 weight percent based upon such carboxylpolymer) it will typically be employed in relatively larger proportions (e.g., from about 40 to about 90 weight percent of the total polymer solids), and (b) when such carboxyl-polymer contains higher levels of carboxylic acid monomer therein (e.g., from about 15 to about 45 weight percent based upon the carboxyl polymer) then such carboxyl-containing polymer will typically be used in the range of from about 15 to about 40 weight percent of the total polymer solids employed in the extrusion foaming process. Naturally, when the olefin polymer to be foamed itself functions as a stability control agent (e.g., substantially non-neutralized copolymers of ethylene and a monoethylenically unsaturated carboxylic acid such as acrylic acid, etc.), the addition of a further stability control agent as a separate additional ingredient is not necessary since in that event such polymer performs the dual function of being both the polymer to be foamed as well as being its own stability control agent.

The term "substantially non-neutralized" as used herein with reference to carboxyl-bearing polymers is intended to refer to such polymers in which only a small amount (e.g., less than 5 percent and preferably essentially none) of the carboxyl groups therein is neutralized or crosslinked with a metal ion and such term thus excludes those neutralized carboxyl-bearing ethylenic copolymers commonly referred to in the art as ionomers.

As has been noted, an important feature of the present invention is the use as the blowing agent herein of a mixed blowing agent system (a) which consists essentially of from about 50 to about 95 weight percent (based upon such blowing agent system) of dichlorodifluoromethane (FC-12) and from about 5 to about 50 weight percent based thereon of an aliphatic hydrocarbon compound, or a halogenated hydrocarbon compound, having an atmospheric pressure boiling point of from 0° C. to about 50° C., and (b) which system exhibits a saturated vapor pressure at 100° C. of less than about 32 kg/cm$^2$ but greater than about 22 kg/cm$^2$. Preferably, such mixed blowing agent system (a) contains from about 5 to about 40 (more preferably from about 5 to 35, most preferably from about 5 to about 25 and especially about 20) weight percent of the indicated 0° C.–50° C. boiling point aliphatic hydrocarbon (and/or halogenated hydrocarbon) compound with the remainder of such system being dichlorodifluoromethane, and (b) exhibits a saturated vapor pressure at 100° C. of greater than about 25 kg/cm$^2$ but less than about 32 kg/cm$^2$. With regard to this latter (i.e., preferred) mixed blowing agent system, it is to be noted (a) that such system provides an especially desirable balance between maximum achievable cross-section, fine cell size and dimensional stability at both ambient and elevated (e.g., 150° F.) temperatures, and (b) that the beneficial performance thereof in the present invention is especially surprising in view of the teaching of U.S. Pat. No. 3,657,165 to the effect that mixed blowing agent systems of this type should have 100° C. saturated vapor pressures of less than 25 kg/cm$^2$.

Suitable 0° C.–50° C. boiling point aliphatic hydrocarbon and halogenated hydrocarbon compounds for use in the aforementioned mixed blowing agent system include n-butane, pentane, trichloromonofluoromethane (FC-11), trichlorotrifluoroethane, dichloromonofluoromethane, ethyl chloride, 1-chloropropane and the like. Preferred 0° C.–50° C. boiling point aliphatic or halogenated hydrocarbon compounds for use herein include trichloromonofluoromethane and ethyl chloride.

In practice, the amount of the aforementioned mixed blowing agent system employed in practicing the present invention will vary and will be dictated primarily by the particular foam density sought to be manufactured via such process. However, as a general rule the amount of such mixed blowing agent employed will typically be in the range of from about 0.12 to about 0.4 gram-mole of the combined mixed blowing agent per 100 grams of the olefin polymer resin to be foamed therewith.

In addition to the hereinbefore described ingredients, there may also be employed in the practice of the present invention other ingredients or additives which conventionally find applicability in known extrusion foaming processes such as, for example, known nucleating (or cell-size controlling) agents (e.g., talc, clay, mica, silica, titanium oxide, zinc oxide, calcium silicate, metallic salts of fatty acids such as barium stearate, zinc stearate, aluminum stearate, etc.), wetting agents, and the like.

The following examples, in which all parts and percentages are on a weight basis unless otherwise indicated, are presented as illustrative of the present invention and are not to be understood as limiting its scope.

EXAMPLE 1

The apparatus used in this example is a 1¼" screw type extruder having additional zones for mixing and cooling at the end of usual sequential zones for feeding, melting and metering. An opening for blowing agent injection is provided in the extruder barrel between the metering and mixing zones. At the end of the cooling zone, there is attached a die orifice having an opening of rectangular shape. The height of the opening is adjustable while its width is fixed at 0.25". therein. The results of various runs performed are summarized in Table I below.

TABLE I

| Test No. | Polymer Type | Blowing Agent Type | Ratio (1) | Level (pph) (2) | Maximum Cross-Section (in²) (3) | Foam Thickness (in) (4) | Foam Density (pcf) (5) | Cell Size (mm) (6) | Room Temp. Foam Stability (%) (7) | 150° F. Foam Stability (%) (8) |
|---|---|---|---|---|---|---|---|---|---|---|
| I.1* | PE 520 | F-12 | — | 16.0 | 1.05 | 1.16 | 2.32 | 1.47 | 95 | 93 |
| I.2 | PE 520 | F-12/F-11 | 90/10 | 16.9 | 1.24 | 1.23 | 2.53 | 2.03 | 97 | 91 |
| I.3 | PE 520 | F-12/F-11 | 80/20 | 16.9 | 1.36 | 1.18 | 2.26 | 1.62 | 96 | 87 |
| I.4 | PE 520 | F-12/F-11 | 70/30 | 17.0 | 1.45 | 1.31 | 2.42 | 1.80 | 94 | 84 |
| I.5 | PE 520 | F-12/F-11 | 65/35 | 17.0 | 1.57 | 1.28 | 2.65 | 2.31 | 94 | 88 |
| I.6 | PE 520 | F-12/F-11 | 60/40 | 17.2 | 1.92 | 1.44 | 2.51 | 3.24 | 90 | 77 |
| I.7 | PE 520 | F-12/F-11 | 50/50 | 17.4 | 1.87 | 1.46 | 2.71 | 3.24 | 88 | 82 |

*Not an example of the present invention.
Notes:
(1) = Weight ratio.
(2) = Parts of blowing agent mixed in per hundred parts of polymer.
(3) = Cross-sectional area of foam body in square inches produced at the critical die gap.
(4) = Thickness of foam body in inches.
(5) = Density of foam body in pounds per cubic foot measured within about five minutes after extrusion.
(6) = Cell size in mm in horizontal direction determined per ASTM D-3576.
(7) = Minimum volume of foam body during aging at ambient temperature as percentage of initial volume which initial volume is measured within about five minutes after extrusion.
(8) = Minimum volume of foam body during aging at 150° F. as percentage of the initial foam volume.

Granular polyethylene having a density of 0.921 g/cc and a melt index of 2.3, talcum powder in an amount of 0.7 part by weight per 100 parts by weight of polyethylene, and a stearamide concentrate consisting of 25 percent by weight of KEMAMIDE® S (trademark of Humko-Sheffield Chemical Company) produced by Humko-Sheffield Chemical Company and 75 percent by weight of polyethylene in an amount sufficient to provide a stearamide level of 1.0 part by weight per 100 parts by weight of total resin are uniformly premixed. A small amount of wetting agent is added to facilitate adhesion of the talcum powder to the polymer granules. The mixture is then fed into the extruder through an opening at one end of the feeding zone at an essentially uniform rate of about 10 pounds per hour. The temperatures maintained at the various extruder zones are approximately 140° C. in the feeding zone, 180° C. in the melting and metering zones and 150° C. in the mixing zone.

A blowing agent comprising dichlorodifluoromethane (F-12) and trichloromonofluoromethane (F-11) and having a composition and rate as shown in Table I is injected into the blowing agent injection port. The temperature of the cooling zone is maintained so as to reduce the temperature of the polymer/blowing agent mixture to a uniform temperature of about 108° C. The resulting foam body exiting the die orifice has an approximately rectangular cross-section with rounded corners and is conducted away from the die opening.

The maximum achievable cross-section of foam body is determined by adjusting the die gap opening and observing the quality of the foam produced at various die gap settings.

At a die gap near that giving the maximum achievable cross-section foam samples are saved to determine dimensional stability and physical properties of the foam. Dimensional stability at ambient temperature is followed with samples having a length of approximately 8 inches and is determined by observing the minimum volume to which such samples shrink at ambient temperature following their preparation. Foam sample volumes are determined by measuring the volume of water displaced by said foam samples when submerged As is seen in Table I, the maximum achievable foam cross-section increases with the level of F-11 in blowing agent while foam dimensional stability at room temperature in general deteriorates with increasing F-11 level. Cell size also increases with the level of F-11, making the foam appear coarse. The data shown in Table I indicate that a blowing agent system containing 10 to 35 percent of F-11 and the remainder thereof being F-12 provided the best balance between increased foam cross-sectional size and the other important properties (e.g., cell size, dimensional stability at both room temperature and 150° F., etc.). Such blowing agent systems have 100° C. saturated vapor pressures in the range of from about 31.4 to about 25.5 kg/cm² and thus are representative of especially preferred embodiments of the present invention.

EXAMPLE 2

The same extrusion apparatus used in Example 1 is employed in this example. A polyethylene having a density of 0.921 g/cc and a melt index of 2.0 is employed as the feedstock. Talcum powder is mixed in at 2.0 parts by weight per 100 parts by weight of polyethylene throughout the tests of this example. Except for Test No. II.1, stearamide concentrate was mixed in so that the level of stearamide became one part per 100 parts by weight of total polyethylene. The operating procedure of the extrusion line in this example was essentially the same as in Example 1.

Blowing agents used in this example are F-12 and its mixtures with ethyl chloride. Table II shows the compositions and the resultant foam properties.

In Test No. II.1, absence of stearamide causes the foam produced in this test to be dimensionally unstable. The blowing agent mixtures comprising 10 and 20 percent of ethyl chloride in Tests No. II.2 and 3 have 100° C. saturated vapor pressures of about 30 and about 26.8 kg/cm², respectively, and provide adequate maximum cross-section and dimensional stability. Tests II.2 and II.3 thus represent preferred embodiments of the present invention. The blowing agent mixture comprising 30 percent of ethyl chloride (i.e., Test II.4) has a 100° C. vapor pressure of about 24 kg/cm² and provides foam having somewhat less dimensional stability and somewhat coarser cell size than that of Tests II.2 and II.3. Thus, Test II.4 while being within the broad scope of the present invention does not represent a preferred embodiment thereof.

Finally, it should be noted that the 40 and 50 weight percent ethyl chloride blowing agent systems (Tests II.5 and II.6) have 100° C. saturated vapor pressures of about 21.6 and 19.5, respectively, and that Tests II.5 and II.6 therefore do not represent examples of the present invention.

While the present invention has been herein described with reference to particular illustrative examples and embodiments thereof, such particulars are not to be understood as further limiting the instantly claimed invention.

TABLE II

| Test No. | Polymer Type | Blowing Agent Type | Blowing Agent Ratio (1) | Level (pph) (2) | Maximum Cross-Section (in²) (3) | Foam Thickness (in) (4) | Foam Density (pcf) (5) | Cell Size (mm) (6) | Room Temp. Foam Stability (%) (7) | 150° F. Foam Stability (%) (8) |
|---|---|---|---|---|---|---|---|---|---|---|
| II.1* | PE 530 | F-12 | — | 20.9 | 1.11 | 1.21 | 2.61 | 1.16 | 77 | — |
| II.2 | PE 530 | F-12/EtCl | 90/10 | 15.1 | 0.93 | 0.99 | 2.35 | 1.01 | 98 | 86 |
| II.3 | PE 530 | F-12/EtCl | 80/20 | 13.4 | 1.39 | 1.23 | 2.31 | 1.16 | 91 | 89 |
| II.4 | PE 530 | F-12/EtCl | 70/30 | 13.0 | 1.34 | 1.28 | 2.28 | 1.47 | 87 | 78 |
| II.5* | PE 530 | F-12/EtCl | 60/40 | 13.0 | 1.77 | 1.43 | 2.26 | 1.62 | 83 | 76 |
| II.6* | PE 530 | F-12/EtCl | 50/50 | 12.4 | 2.12 | 1.56 | 2.14 | 2.31 | 51 | — |

*Not an example of the invention.
Notes:
(1) through (8) are the same as in Table I.

What is claimed is:

1. A process for preparing closed-cell olefin polymer foamed articles having increased maximum achievable cross-sectional areas and having good dimensional stability which process comprises the steps of:
   (A) heat plastifying a normally solid olefin polymer resin selected from the group consisting of ethylene homopolymers and substantially non-neutralized ethylenic copolymers derived from at least about 50 weight percent of ethylene;
   (B) admixing said heat plastified resin under elevated temperature and pressure with
      (1) a stability control agent selected from the group consisting of partial esters of long-chain fatty acids with polyols, higher alkyl amines, fatty acid amides, complete esters of higher fatty acids, and substantially non-neutralized a-olefin-monoethylenically unsaturated carboxylic acid copolymers and
      (2) a mixed blowing agent
         (a) which comprises from about 50 to about 95 weight percent of dichlorodifluoromethane and from about 5 to about 50 weight percent of an aliphatic hydrocarbon compound or a halogenated hydrocarbon compound having a normal atmospheric boiling point of from about 0° C. to about 50° C., and
         (b) which has a saturated vapor pressure at 100° C. of less than about 32 kg/cm² but greater than about 25 kg/cm²; and
   (C) extruding the resultant mixture into a zone of lower temperature and pressure to thereby form said olefin polymer foam.

2. The process of claim 1 wherein the mixed blowing agent consists essentially of from about 5 to about 40 weight percent of said aliphatic or halogenated hydrocarbon compound and from about 60 to about 95 weight percent of dichlorodifluoromethane.

3. The process of claim 1 wherein the olefin polymer is a homopolymer of ethylene, a copolymer thereof with up to about 50 weight percent of vinyl acetate, propylene, butene-1, butadiene, vinyl chloride, methyl methacrylate or acrylonitrile or a substantially non-neutralized copolymer of ethylene with up to about 50 weight percent of acrylic acid.

4. The process of claim 1 wherein the olefin polymer is polyethylene.

5. The process of claim 1 wherein the stability control agent is stearamide.

6. The process of claim 1 wherein the aliphatic or halogenated hydrocarbon component of the mixed blowing agent is ethyl chloride or trichloromonofluoromethane.

7. The process of claim 1 wherein the aliphatic or halogenated hydrocarbon component of the mixed blowing agent is trichloromonofluoromethane.

8. The process of claim 1 wherein the mixed blowing agent is employed in an amount of from about 0.12 to about 0.4 gram moles per 100 grams of olefin polymer.

9. The process of claim 1 wherein the stability control agent is stearamide and is employed in an amount of from about 0.1 to about 10 weight percent based upon the olefin polymer weight.

10. The process of claim 1 wherein the foam produced thereby has a cross-sectional area of greater than 50 square inches taken in a plane perpendicular to the direction of extrusion.

11. The process of claim 1 wherein the foam produced thereby does not shrink to less than about 85 percent of its initial volume at ambient temperature at any point during the manufacture thereof.

12. The process of claim 1 wherein the olefin foam produced has a density of from about 1 to about 6 pounds per cubic foot.

13. The process of claim 1 wherein the mixed blowing agent (a) consists essentially of from about 5 to about 25 weight percent of said aliphatic or halogenated hydrocarbon compound and from about 75 to about 95 weight percent of dichlorodifluoromethane.

14. The process of claim 13 wherein the aliphatic or halogenated hydrocarbon compound of the mixed blowing agent is ethyl chloride or trichloromonofluoromethane.

15. The process of claim 13 wherein the aliphatic or halogenated hydrocarbon compound of the mixed blowing agent is trichloromonofluoromethane.

16. The process of claim 13 wherein the aliphatic or halogenated hydrocarbon compound of the mixed blowing agent is ethyl chloride.

17. The process of claim 1 wherein the aliphatic or halogenated hydrocarbon compound of the mixed blowing agent is ethyl chloride.

18. The process of claim 1 wherein the mixed blowing agent (a) comprises from about 5 to about 35 weight percent of said aliphatic or halogenated hydrocarbon compound and from about 65 to about 95 percent of dichlorodifluoromethane.

19. The process of claim 18 wherein the stability control agent is a saturated higher fatty acid amide, a higher alkyl amine or a complete ester of a polyhydric alcohol with a saturated higher fatty acid.

20. The process of claim 18 wherein the stability control agent is a saturated higher fatty acid amide.

* * * * *